Patented Oct. 24, 1944

2,361,301

UNITED STATES PATENT OFFICE 2,361,301

STABILIZATION OF AZO DYESTUFFS

James W. Libby, Jr., Claymont, and Joseph H. Trepagnier, Wilmington, Del., assignors to E. I. du Pont de Nemours & Company, Wilmington, Del., a corporation of Delaware No Drawing. Application July 3, 1941, Serial No. 400,966

2 Claims. (Cl. 260—208)

This invention relates to processes for stabilizing azo dyestuffs which have a meta-dihydroxy benzene as an end component, and to compositions which are manufactured from such processes.

Numerous valuable direct dyes which are suitable for dyeing cellulosic fibers, such as cotton and regenerated cellulose rayon, and which have at least one end component derived by coupling with a compound of the meta-dihydroxy benzene series are known. Such dyes, like many other direct azo dyes which do not contain a resorcin radical as an end component are normally isolated from the coupling medium in the form of their alkali metal salts since the final coupling is generally carried out in alkaline medium and since it is known that the soluble azo dyes in general are more readily soluble and hence are in a more convenient form for making dyebaths when they exist in the form of their alkali metal salts. While the resorcin-containing dyestuffs in question are entirely satisfactory in the form of their alkali metal salts when they are used soon after they are prepared, it has been discovered that they are unlike the direct dyes which do not contain end resorcin radicals, in that they deteriorate upon storage and in that they lose dyeing strength. In the case of some members of the class in question a change of shade is also effected if they are stored in the form of the alkali metal salts thereof. It was therefore desirable to provide means for producing the dyes in a form which would be stable upon storage and which would be in a convenient and acceptable form for the purpose of making dyebaths in the dye house.

It is among the objects of the invention to provide direct dyes having a resorcin end component in a form which is stable upon storage and which is in a suitable form for making dyebaths. Other objects of the invention will be apparent from the following description.

The objects of the invention are attained by providing the dyestuff in an acid form and then using this product to make a comminuted dry mixture which contains at least sufficient of a non-deliquescent alkali to form the alkali metal salt of the dyestuff when the composition is disposed in aqueous medium. A stable composition is thus formed which can be readily dissolved by the dyer to make dyebaths in a manner which is like that employed to make dyebaths from the alkali metal salt forms of the dyestuffs.

The invention will be more fully set forth in the following more detailed description which includes examples that are given as illustrative embodiments of the invention and not as limitations thereof. Parts are expressed in parts by weight unless otherwise noted.

Example 1

In the manufacture of the dyestuff 3-(4'-aminobenzoylamino)-1-amino-benzene ⇌ [1-(3'-amino-phenyl)-5-pyrazolone carboxylic acid]₂ ⇌ [1,3-dihydroxy benzene]₂, the final coupling is made in a medium which is made alkaline with sodium carbonate and it is separated from the coupling medium as the sodium salt which is represented by the formula:

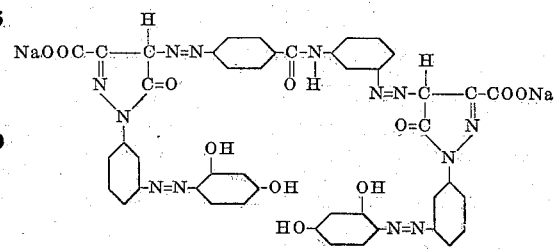

and dried at 80° to 85° C., yielding a yellow orange powder.

This dyestuff gives excellent dyeings from aqueous solutions thereof on cellulosic fibers in bright gold shades which yield white discharges. The dyeings can be after-treated with formaldehyde and the washing fastness thereof can thus be greatly improved without material impairment of other properties.

However, when this dyestuff is stored, it begins to deteriorate. For example, its dyetest strength upon one month's storage at about 25° C. is about 305% as compared to its dyetest strength of 360% when freshly prepared. When the dye is stored one month at about 50° C. the dyetest strength is about 250%. With longer storage, the dyetest strength decreases.

Example 2

The product of coupling described in Example 1 was made, but before it was separated and dried in the form of its sodium salt, the final coupling medium was heated to 50°-60° C. and a 30% solution of hydrochloric acid was added until the medium was acid to Congo red paper. The resulting slurry was then stirred for a half hour, the dyestuff was filtered out and the resulting dyestuff in its acid form was dried at 80°-85° C. The product was a dry powder, orange in shade and it is represented by the formula

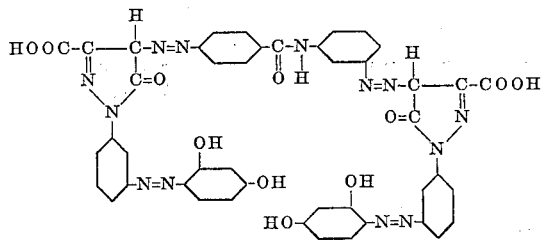

This dried powder was mixed with sodium carbonate and sugar for 16 hours in a ball mill in the proportion of 15 parts of the dyestuff, 12.5 parts of sodium carbonate and 17.5 parts of sugar. The resulting virtually dry powder was readily soluble in hot water and could be used by the dyer to make dyebaths in the same manner that the sodium salt of the dyestuff was used.

The comminuted product was a uniform composition, free-flowing, readily soluble in hot water, non-deliquescent and virtually dry. Deterioration of the dye contained in the composition did not take place upon storage. For example, the dyetest strength of the freshly prepared composition was the same as the dyetest strength of a portion which had been stored one month at about 25° C. and of another portion which had been stored one month at about 50° C. The acid form of the product which had not been mixed with the alkali gave the same results when tested for stability.

As compared to another virtually dry composition which was prepared in the same manner except that the sodium salt of the dyestuff was used, it was found that the composition made with the sodium salt of the dyestuff had deteriorated in one month's storage at about 50° C. from a relative dyetest value of 183% for the freshly prepared composition to a dyetest value of 142%.

*Example 3*

The dyestuff di-(4-amino-phenyl) urea ⇒ 2-amino-8-naphthol-6-sulfonic acid ⇒ 1,3-dihydroxy benzene was acid-isolated from the last coupling medium in a manner similar to that described in Example 1 and dried. The acid-isolated product is represented by the following probable formula

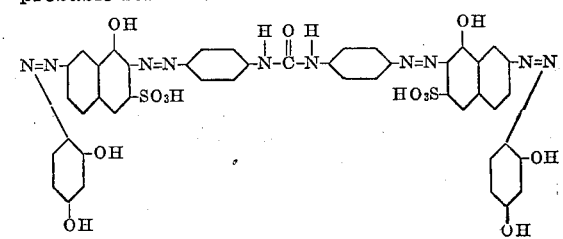

This product in the form of a dark dry powder was mixed in a ball mill for 16 hours with dry sodium carbonate and sugar in the proportion of 15 parts of the dyestuff, 12.5 parts of sodium carbonate and 17.5 parts of sugar. The resulting virtually dry powder was free-flowing, readily soluble, non-deliquescent and virtually dry. Dyebaths made by dissolving the composition in water and after-treating with formaldehyde gave dyeings in deep brown shades which had excellent washing fastness and good discharge properties.

As compared to the dye in the form of its sodium salt, portions of the composition described in Example 3 which were stored at 25° C. and 50° C. showed no deterioration at the end of one month, whereas the dye in the form of its sodium salt showed a relative deterioration in dyetest strength from 400% to 330% upon storage for one month at 25° C. and from 400% to 280% when stored at 50° C. Dyeings made with the dye in the form of the sodium salt which had been stored were yellower than the dyeings made with the freshly prepared dyes.

As illustrations of other dyestuffs of the class which deteriorate upon storage in the form of the alkali metal salts and which do not deteriorate in compositions similar to those described in Examples 2 and 3 wherein they are used in their acid-isolated forms are mentioned 4-(4'-amino - benzoyl - amino)-aniline⇒(1-amino-5-naphthol - 7 - sulfonic acid)$_2$⇒(1,3-dihydroxy-benzene)$_2$; 1-naphthol-4-sulfonic acid←4-amino-aniline→1-amino-naphthalene - 6 - sulfonic acid →1-amino-naphthalene-7-sulfonic acid→1,3-dihydroxy - benzene; 1,2-bis(4 - amino - phenoxy-acetyl-amino)ethylene⇒[2-(3'-amino-benzoyl-amino)-5-naphthol-7-sulfonic acid]$_2$⇒1,3 - dihydroxy-benzene; 3-(4'-amino-phenoxy-acetyl-amino)-aniline⇒[2(4'-amino-3'-sulfo-phenyl-amino)-5-naphthol - 7 - sulfonic acid]$_2$⇒(1,3-dihydroxy-benzene)$_2$; 4,4'-diamino-diphenyl⇒ (2 - amino-5-naphthol-7-sulfonic acid)$_2$⇒(1,3-dihydroxy-benzene)$_2$; 4-amino-benzene sulfonic acid→aniline→2-(4'-amino - benzoyl - amino)-5-naphthol-7-sulfonic acid→1,3 - dihydroxy - benzene; 4,4'-diamino - azobenzene⇒(2-amino-8-naphthol - 6 - sulfonic acid)$_2$⇒(1,3-dihydroxy-benzene)$_2$; 1,3 - dihydroxy - benzene←(3-methyl aniline←1,4-diamino - naphthalene - 6 - sulfonic acid→1-naphthol - 5 - sulfonic acid; 2 - amino - naphthalene-6,8-disulfonic acid→3-methyl - aniline→3-methyl-aniline→3,3' - diamino - sym. diphenyl - urea⇒(1,3 - dihydroxy - benzene)$_2$; 4-amino - azobenzene→1-amino-5-naphthol-7-sulfonic acid→1,3 - dihydroxy - benzene; 1,3 - dihydroxy - benzene←1,3 - diamino - benzene→1 - (3'-amino - phenyl) -5-pyrazolone-3-carboxylic acid →1-amino - naphthalene-6-sulfonic acid→1,3-dihydroxy - benzene; 3,3-diamino - sym. diphenyl-urea⇒(2 - amino-5-naphthol-7-sulfonic acid)$_2$ ⇒(1,3-dihydroxy - benzene)$_2$; 4,4'-diamino-diphenyl⇒(1-amino - 8 - naphthol-3,6 -disulfonic acid)$_2$⇒(1,3 - dihydroxy - benzene)$_2$; 3-amino-benzene sulfonic acid→aniline→2-(4'-amino-3'-sulfo - phenyl) -5-naphthol-7-sulfonic acid→1,3-dihydroxy-benzene; 1,8-dihydroxy naphthalene-3,6-disulfonic acid←4,4' - diamino - 3,3'-dimethoxy-diphenyl→1-amino - naphthalene-6-sulfonic acid→1,3 - dihydroxy - benzene; 1,3 - dihydroxy-benzene←1 - amino-8-naphthol - 3,6.- disulphonic acid←4,4'-diamino - diphenyl→1-(3'-amino - benzoyl-amino) -8-naphthol - 3,6 - disulfonic acid→ 1,3-dihydroxy-benzene; 1,3-dihydroxy-benzene← 2-(3'-amino-benzoyl - amino) -5-naphthol-7-sulfonic acid←4,4'-dimethyl-3,3' - diamino - azoxy-benzene→2 - amino-5-naphthol-7-sulfonic acid→ 1,3-dihydroxy-benzene; 2-amino-naphthalene→ 2-(4'-amino - benzoyl-amino) -5-naphthol-7-sulfonic acid→1,3 - dihydroxy - benzene; 1,3 - dihydroxy - benzene←4,4' - diamino - diphenyl - thio-ether→2-(3'-amino-benzoyl-amino) -5-naphthol-7-sulfonic acid→1,3-dihydroxy-benzene; aniline →2-amino-5-naphthol-7-sulfonic acid→2-amino-5-naphthol-7-sulfonic acid→1,3-dihydroxy - benzene and 4,4' - diamino - 3,3' - dimethyl-2,2'-dichloro - diphenyl⇒[2-(3' - amino-4'-methoxybenzoyl - amino) - 5 - naphthol-7-sulfonic acid]₂
=>(1,3-dihydroxy-benzene)₂.

Instead of using the acid-isolated dyestuff which is produced by acidification of the final coupling medium after coupling has taken place, the same results are obtained by using an acid-isolated form of the dyestuff which is produced in any manner, such as by acidification of a wet slurry of the dried alkali metal salt of the dyestuff, or by acidification of the slurry made from the wet filter cake of the alkali metal salt of the dye. Any non-oxidizing strong acid can be used. That is to say, any acid can be used which is capable of converting the salt of the dyestuff to a form like the acid-isolated form. It is immaterial what method is used to provide the dyestuff in this form.

Any non-deliquescent alkali of an alkali metal can be used as the alkali in the dyestuff composition instead of sodium carbonate, such as sodium bicarbonate, disodium phosphate, borax or the corresponding potassium salts. Mixtures of such alkalies can also be used with the same effect. However, from considerations of general utility and the best general properties of the products, sodium carbonate is preferred as the alkali constituent. Fine grinding promotes the speed of solution.

Any solid diluent which dissolves in aqueous alkaline solutions and which is inert can be used instead of sugar, such as sodium chloride and sodium sulfate. The term inert as used in the specification and claims refers to diluents which do not react with the dyestuff or form insoluble compounds. Sugar is the preferred diluent because of its desirable physical properties, high solubility and non-salting properties. However, the diluent is non-essential in so far as the keeping properties of the compositions are concerned. Diluents are used in order to provide a desired dyestuff content per unit of composition when the desired dilution cannot be attained by the use of the alkali without having present an undesirable excess of alkali. The ratio of alkali to dyestuff should be at least sufficient to form the alkali metal salt of the dyestuff when the composition is disposed in water but a considerable excess of alkali may be present.

From the foregoing disclosure it will be recognized that the invention is susceptible of modification without departing from the spirit and scope thereof and it is to be understood that the invention is not restricted to the specific illustrations thereof herein set forth.

We claim:

1. The process of stabilizing a direct azo dyestuff of the type which is unstable upon storage when in the form of its alkali metal salt and which has at least one radical of the meta-dihydroxy benzene series as an end component, which comprises transforming the dyestuff into its solid acid-isolated form and drying the same, then mixing the dry acid-isolated compound with at least sufficient of a dry solid non-deliquescent alkali of an alkali metal to form the alkali salt of the dyestuff when the mixture is disposed in aqueous medium and mechanically working the mixture until a dry powdery mixture of uniform composition is formed.

2. The process in accordance with claim 1 in which the alkali is sodium carbonate.

JAMES W. LIBBY, Jr.
JOSEPH H. TREPAGNIER.